United States Patent [19]

Nishizawa et al.

[11] Patent Number: 4,608,608

[45] Date of Patent: Aug. 26, 1986

[54] SOLID-STATE IMAGING SYSTEM WITH SMEAR SUPPRESSION CIRCUITS

[75] Inventors: Shigeki Nishizawa; Tetsurou Izawa, both of Mobara, Japan

[73] Assignee: Hitachi, Ltd., Tokyo, Japan

[21] Appl. No.: 676,312

[22] Filed: Nov. 29, 1984

[30] Foreign Application Priority Data

Nov. 30, 1983 [JP] Japan ................................ 58-224118
May 18, 1984 [JP] Japan ................................. 59-98694

[51] Int. Cl.⁴ .............................................. H04N 3/14
[52] U.S. Cl. .................................................... 358/213
[58] Field of Search ................ 358/213, 212, 167, 163; 357/24 LR

[56] References Cited

U.S. PATENT DOCUMENTS

4,490,744 12/1984 Levine .................................. 358/213
4,516,172  5/1985 Miyata et al. ....................... 358/213
4,543,610  9/1985 Ozawa et al. ....................... 358/167
4,547,807 10/1985 Mitani et al. ........................ 358/213

Primary Examiner—Gene Z. Rubinson
Assistant Examiner—Stephen Brinich
Attorney, Agent, or Firm—Antonelli, Terry & Wands

[57] ABSTRACT

There is provided an operational amplifier for subtracting the voltage responsive to the totalized smear component appearing on an even (or odd) vertical signal line to which none of an accessed or scanned photo-diode is coupled, from the voltage responsive to the imaging signal as well as the totalized smear components appearing on an odd (or even) vertical signal line to which a photo-diode accessed or scanned by the vertical scanning light pulses is coupled. There is further provided circuits for detecting whether the amount of the imaging signal and the totalized smear components exceeds a predetermined value and inactivating the subtractor or ignoring its output when the detecting output represents an overabundance, thereby preventing the reaction because of overactive subtraction of the smear component.

6 Claims, 9 Drawing Figures

SOLID-STATE IMAGING SYSTEM WITH SMEAR SUPPRESSION CIRCUITS

BACKGROUND OF THE INVENTION

The present invention relates to a solid-state imaging device. In particular, the invention concerns a solid-state imaging device which is provided with means for suppressing the phenomenon of smear.

In the imaging device for converting images into electric signals, there prevails at present a tendency for employing as a photoelectric converter element a solid-state imaging element realized through semiconductor integrated circuit technology. Owing to the use of such solid-state imaging element, the imaging device can be implemented in a much miniaturized size with lower weight and enjoy higher reliability as well as a lengthened use life when compared with the pickup-tube type imaging device.

Figure 3:
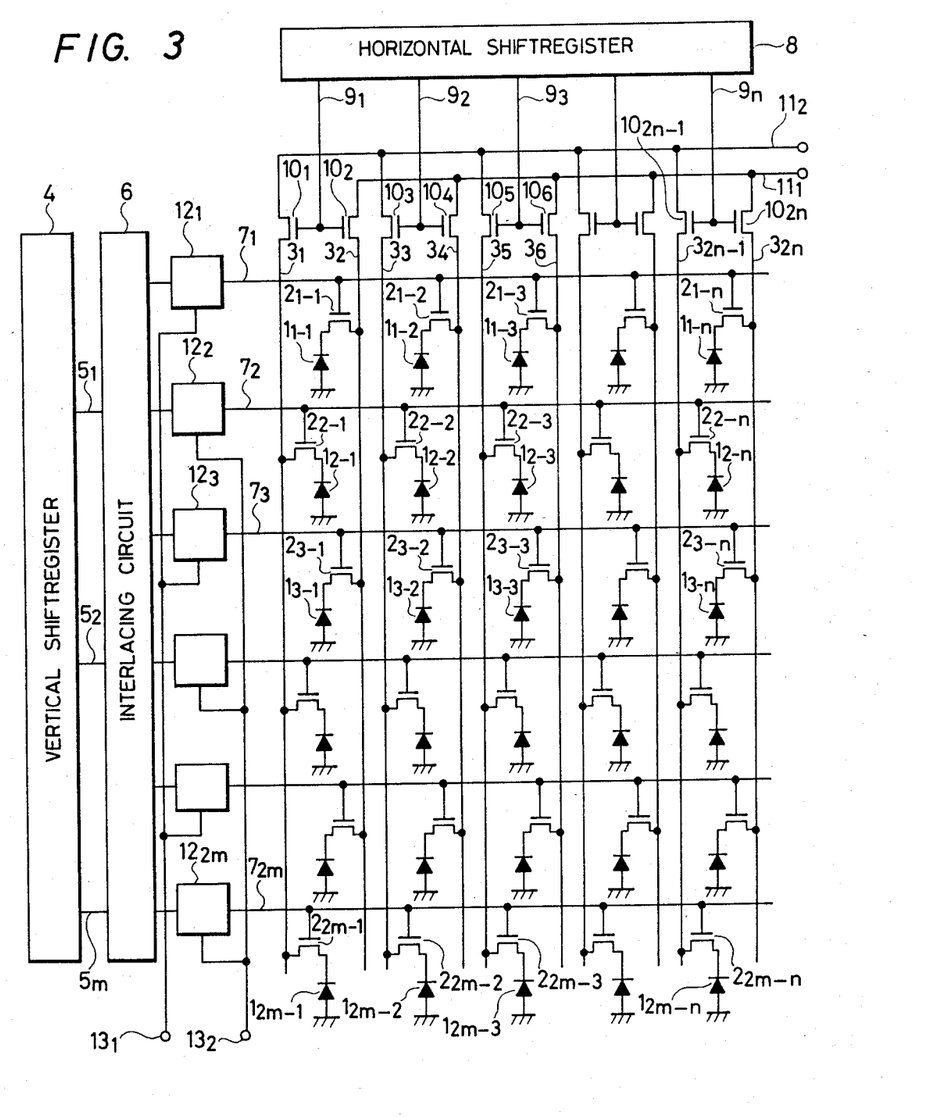
FIG. 3 is a view showing an exemplary circuit configuration of a MOS type solid-state imaging device to which the present invention can be applied.

There is shown in in FIG. 3 of the accompanying drawings of a circuit configuration of a well known solid-state imaging device. See, for example, U.S. Pat. No. 4,392,158 dated July 5, 1983 assigned to the present assignee. Referring to this Figure, it goes without saying that only the regions of photodiodes 1 should desirably exhibit the sensitivity to light. In practice, however, peripheral parts of the photodiodes such as, for example, drain regions of MOS transistors 2 connected to the vertical signal lines 3 may often have the light sensitivity. In this connection, it should be noted that all the drains of the several hundred MOS transistors arrayed in the vertical direction are connected to each of the vertical signal lines 3. Accordingly, electric charges generated photoelectrically in all the drain regions are totaled to be stored or accumulated on the vertical signal lines 3, resulting in that signal charge proportional to the amount of light integrated in the vertical direction of a projected light image is stored or accumulated on each of the vertical signal lines.

Figure 2A:
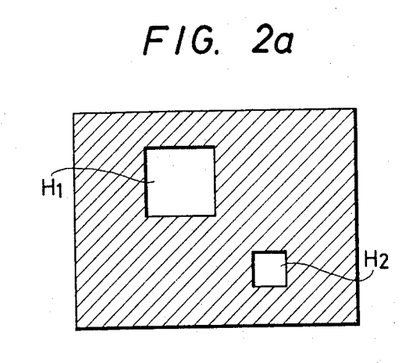
FIGS. 2a and 2b are views for illustrating generation mechanism of vertical smears.
Figure 2B:
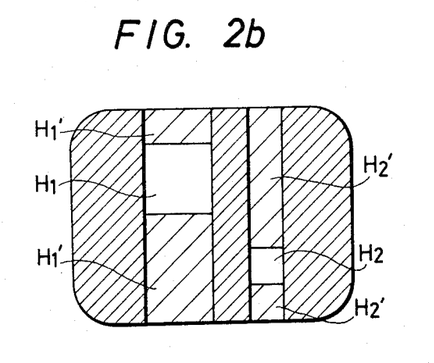

The signal charge thus accumulated is output as superposed on normal signal charge generated by the photodiodes in every horizontal scan period. For this reason, when an image of an object to be picked up has bright portions $H_1$ and $H_2$ with dark surroundings shown in FIG. 2a, there are produced "false signals" which correspond to vertically trailing portions $H_1'$ and $H_2'$ with enough illuminance to be visual, as shown in FIG. 2b.

The noise component peculiar to the solid-state imaging device is referred to as the vertical smear. See, for example, Japanese Patent Laid-Open No. 57-17276 laid open Feb. 1, 1982 (Japanese patatent application No. 5681085 dated July 20, 1979) assigned to the present assignee.

SUMMARY OF THE INVENTION

An object of the present invention is to provide a solid-state imaging system with smear suppressing circuits.

Another object of the present invention is to provide a solid-state imaging system including means for suppressing the smear without reaction upon the normal imaging signal.

A further another object object of the present invention is to provide a solid-state imaging system suitable for picking-up an image with adjusting of the stop of the camera to a dark visual field such as a moonlight scene, while there is a bright light.

According to an embodiment of the present invention there is provided an operational amplifier for sutracting the voltage responsive to the totalized smear component appearing on an even (or odd) vertical signal line to which none of an accessed or scanned photo-diodes are coupled, from the voltage responsive to the imaging signal as well as the totalized smear components appearing on an odd (or even) vertical signal line to which a photo-diode accessed or scanned by the vertical scanning light pulses is coupled.

There is further provided circuits for detecting whether the amount of the imaging signal and the totalized smear components exceeds a predetermined value and inactivating the subtracter or ignoring its output when the detecting output represents an overabundance, thereby preventing the reaction because of overactive subtraction of the smear component.

The present invention will be more apparent from the following detailed description taken in conjunction with the accompanying drawings.

Before entering into detailed explanation of the present invention, the interlacing operation of a MOS type solid-state imaging device to which the invention may be applied will first be described.

Referring to FIG. 3 which shows a MOS type solid-state imaging device, output pulses appearing sequentially on the output lines $5_1, 5_2, \ldots, 5_m$ of a vertical shift register 4 are applied to an interlacing circuit 6. Gate circrits $12_1, 12_2, \ldots$ and $12_{2m}$ are provided between the interlacing circuit 6 and the output lines $7_1, 7_2, \ldots$ and $7_m$, respectively. The gate circuits have respective control inputs connected alternately for every other one of the control terminals $13_1$ and $13_2$.

Assuming now that a turn-on signal is applied to the control terminal $13_1$ for the odd-numbered field with a turn-off signal being simultaneously applied to the control terminal $13_2$, only one (output of $12_1$) of the output pulses applied to the gate circuits $12_1$ and $12_2$ from the interlacing circuit 6 during, for example, the first horizontal scan period will be transmitted to the output line $7_1$. As the consequence, only the photosignals of the photodiodes $1_{1-1}, 1_{1-3}, \ldots$ and $1_{1-m}$ arrayed in the first row are transferred to the vertical signal line $3_2, 3_4, \ldots$ and $3_{2m}$. On the other hand, the vertical smear signals are stored or accumulated on the vertical signal lines 3 regardless of whether the associated MOS transistors 2 are turned on or off. This results in that during each horizontal scan period of the odd-numbered field, the photo-signals $S_o$ of the photodiodes belonging to one of the odd-numbered rows are obtained from the signal output line $11_1$ together with the vertical smear signals $V_e$ stored on or held by the vertical signal lines $3_2, 3_4, \ldots$ and $3_{2n}$, while the smear signals $V_o$ stored on the vertical signal lines $3_1, 3_3,$ and $3_{2n-1}$ are obtained through the signal output line $11_2$.

In a similar manner, in the scanning of the even-numbered field, the turn-off signal is applied to the control terminal $13_1$ while the turn-on signal is applied to the control terminal $13_2$. On these conditions, the output pulses are transmitted only to the output line $7_2$ during, for example, the first horizontal scan period, whereby the photo-signals output from the photodiodes $1_{2-1}, 1_{2-2}, \ldots$ and $1_{2-n}$ are transferred to the vertical signal lines $3_1, 3_3, \ldots$ and $3_{2n-1}$. As a result, during each horizontal scan period of the even-numbered field, the photo-signals $S_e$ output from the photodiode belonging to the even-numbered rows are obtained from the signal output line $11_2$ together with the vertical smear signals $V_o$ stored on the vertical signal lines $3_1, 3_3, \ldots$ and $3_{2n-1}$, while the vertical smear signals $V_e$ stored on the vertical signal lines $3_2, 3_4, \ldots$ and $3_{2n}$ are obtained from the signal output line $11_1$.

Considering now the fact that the vertical smears of two vertical signal lines which are located adjacent to each other in the spatial position such as the vertical signal lines $10_2$ and $10_3$, $10_4$ and $10_5, \ldots, 10_{2n-2}$ and $10_{2n-1}$, the following relation applies valid:

$$V_o = V_e \quad (1)$$

Figure 4:
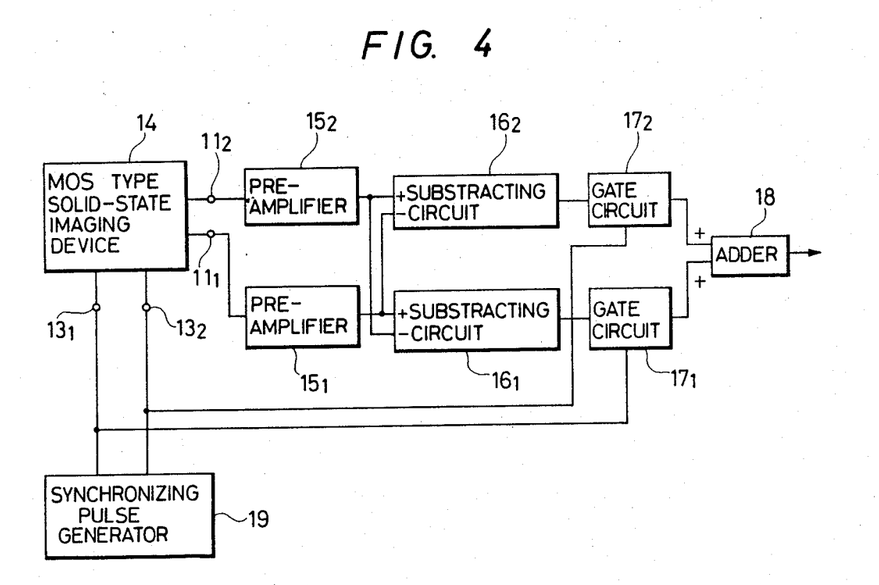
FIG. 4 is a view showing smear suppressing circuits according to the application which has been filed before the present application and assigned to the present assignee.

Smear reduction or suppression circuits utilizing the above equation are shown in FIG. 4 (filed July 29, 1983, U.S. Pat. No. 4,543,610, assigned to the same assignee). As clear from the drawing the signal $S_{out1}$ applied to the adder circuit 18 from the subtracting circuit $16_1$ through the gate circuit $17_1$ for the odd-numbered field is represented as follows:

$$\begin{aligned} S_{out1} &= (S_o + V_e) - V_o \\ &= S_o \end{aligned} \quad (2)$$

Thus the signal $S_{out1}$ without vertical smear is obtained.

Meanwhile, in the even-numbered fields, the vertical smear signal $(V_e)$ obtained from the signal output line $11_1$ is subtracted from the signal $(S_e + V_o)$ obtained from the signal output line $11_2$. Namely, from the equation (1), $$\begin{aligned} S_{out2} &= (S_e + V_o) - V_e \\ &= S_e \end{aligned} \quad (3)$$

The signal $S_{out2}$ which does not contain the vertical smear signal can then be obtained.

As described above, use of the smear suppression circuit shown in FIG. 4 makes it possible to prevent generation of the vertical smear signal but also raises a problem that the vertical smear signal component is subtracted excessively from signal component during the high illuminance period.

Next, a problem of excessively subtracting the vertical smear signal component mentioned above will be explained by referring to FIG. 5.

Figure 5:
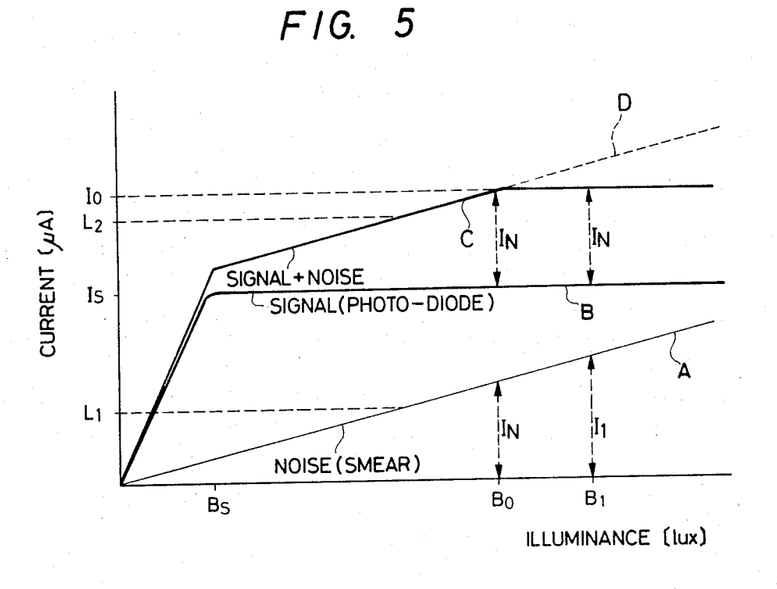
FIG. 5 shows dependency of electrically converted imaging signal and smear represented by electrical charge amount or detecting current upon illuminance for explaining the present invention.

FIG. 5 shows a graph indicating dependency of imaging characteristic on illuminance. An imaging data is stored in a photodiode 2, while a smear noise component to each vertical signal line 3 respectively with amount of charges in accordance with illuminance of an object. However these charges are released at the time of accessing, namely at the time of scanning. At this time, movement of charges is indicated as a current. Since a pre-amplifier outputs a signal in dependence upon a detected signal, signal and noise component, input/output level of pre-amplifier and operation of subtract circuit are all expressed in terms of current values on the vertical axis.

As will be understood from the same figure, a signal component B saturates with a certain illuminance $B_s$ owing to the photodiode characteristic but noise component A continuously increases in accordance with illuminance even in the region which is higher than the saturation point $B_s$ by several times. The pre-amplifier 15 is also destined to have the saturation point $(B_0)$. Therefore, in case an object is under the illuminance $B_1$ which is exceeding the saturation point $B_0$ of the pre-amplifier, for example, in the odd-numbered fields, a sum C of the signal component output from the pre-amplifier $15_1$ and the smear component is suppressed to $I_0 (= I_s + I_N)$ but the smear component A output from the pre-amplifier $15_2$ is not suppressed and becomes equal to $I_1$ which is larger than $I_N$. Therefore, a difference between output signals of both amplifiers becomes lower than the intrinsic saturation signal amount $I_s$.

Such excessive subtraction phenomenon occurs when the aperture of the image pickup camera for the object is set wide in a dark field such as within a room or in an outside field at night and the object can be taken sufficiently in the region up to the saturation point $B_s$. Namely, above excessive subtraction phenomeonon often and easily occurs in case the same field is irradiated with the lighting in the illuminance $B_1$ by far exceeding the illuminance $B_s$. In such a case, the illuminance becomes low due to such excessive subtraction and the object is taken extremely black or darker than the other objects.

The present invention is then explained in detail with reference to an embodiment thereof.

Figure 7:
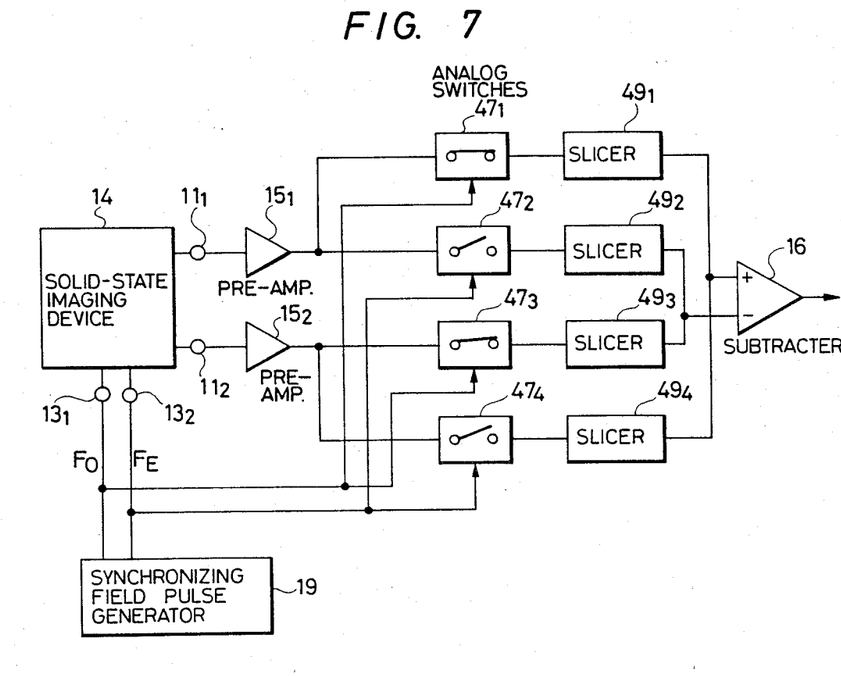
FIG. 7 and FIG. 8 each shows another embodiment of the smear suppressing circuits according to the present invention.

FIG. 7 is a schematic diagram showing an example of a solid-state imaging system to which the present invention is applied. The same elements are given the same symbols as those used in the preceding figures. In the same figure, the analog switches $47_1, 47_2, 47_3, 47_4$ which turn on and off respectively in synchronization with the odd- and even-numbered field selection pulse signal to be input to the control terminals $13_1$ and $13_2$ of a solid-state imaging device 14 from a pulse generator 19 and the slicers $49_1, 49_2, 49_3, 49_4$ which cut unwanted vertical smear signal from the output signals of said analog switches $47_1, 47_2, 47_3, 47_4$ are connected in series corresponding to each other between the preamplifiers $15_1, 15_2$ and the subtraction circuit 16. These slicers $49_1, 49_2, 49_3, 49_4$ are set to have the slice level $L_1$ for cutting the vertical smear signal at a constant level and the slice level $L_2$ for cutting the signal (signal + vertical smear signal) at a constant level.

With such structure, an output signal generated from the signal output lines $11_1$ and $11_2$ of the solid-state imaging device 14 are amplified by the preamplifiers $15_1$ and $15_2$ and then input respectively to the switches $47_1$, $47_2$, $47_3$, $47_4$.

The output signals of preamplifiers $15_1$, $15_2$ are limited to the particular voltage levels called the slice levels $L_1$ and $L_2$. However, such voltge levels are indicated by corresponding current values for the convenience of explanation as shown in FIG. 5. As is apparent from FIG. 5, the slice level $L_2$ is lower than the saturation level $I_0$ of the preamplifiers $15_1$, $15_2$ and is set almost equal to a sum of the photoelectric conversion saturation level $I_s$ of signal component and the slice level $L_1$ of smear.

The signal output to the first field (odd-numbered field) from a preamplifier $15_1$ is composed of the vertical smear signal $V_e'$ and photo signal $S_o$, while the signal output from the preamplifier $15_2$ is composed of only the vertical smear signal, as explained above. In the second field (even-numbered field), such relation is inverted. On the other hand, in the case of the imaging device of the prior art shown in FIG. 4, the outputs of the preamplifiers $15_1$ and $15_2$ have been input to the subtracter 16, but in case the preamplifier $15_1$ or $15_2$ is saturated for an input under a high illuminance (photosignal+vertical smear signal>$I_0$), an excessive subtraction of vertical smear signal occurs (since $I_1>I_N$) when the vertical smear signal $V_o$ (=$I_1$) is subtracted from (vertical smear signal $V_e'$+photo-signal $S_o$=$I_0$). Therefore, in the present invention, the signal of (vertical smear signal $V_e'$+photo signal $S_o$) and the signal of only vertical smear signal $V_o$ are selected for separation by the switches $47_1$, $47_2$, $47_3$, $47_4$, and thereafter the component higher than the level $L_1$ of the smear signals $V_e$ and $V_o$ is cut by the slicers $49_2$ and $49_3$ having a constant slice level $L_1$. Thereby, operation of excessively subtracting the vertical smear signal from corresponding (photo signal+smear signal) can be prevented. The slicers $49_1$ and $49_4$ are also provided for the photo signals accompanied by the vertical smear signal in order to eliminate the effect of the difference in saturation characteristics between the preamplifiers $15_1$ and $15_2$ and these slicers $49_1$ and $49_4$ may also be removed. In such a case, it is required to set the slice level $L_1$ to the level which is almost equal to a value $I_N$ obtained by subtracting the saturation level $I_s$ of photodiode from the saturation level $I_0$ of the preamplifier.

According to this constitution, it is also possible that a peak value of output signals of preamplifiers $15_1$ and $15_2$ is detected corresponding to brightness of the object and the slice levels $L_1$ and $L_2$ are automatically set in accordance with such peak value.

Figure 8:
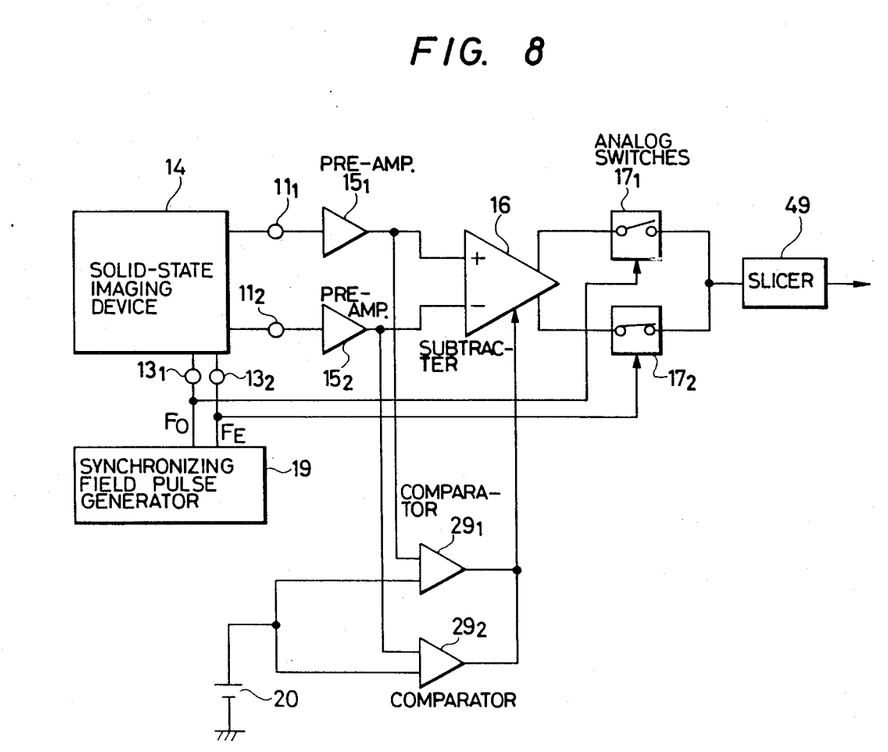

FIG. 8 is a schematic diagram indicating another embodiment of a solid-state imaging system to which the present invention is applied, and the same elements as those in the figure mentioned above are given the same symbols. In this figure, the comparators $29_1$ and $29_2$ which compare signal amplitudes of preamplifiers $15_1$ and $15_2$ with a certain reference voltage 20 are provided in addition to the constitution of FIG. 4 and the slicer 49 is also provided in order to cut the component exceeding the specified level of output of the switches $17_1$ and $17_2$.

Output signals of the signal output lines $11_1$ and $11_2$ of a solid-state imaging device 14 are amplified by the preamplifiers $15_1$ and $15_2$ as in the case of the prior art shown in FIG. 4 and are then input respectively to a subtracter 16.

Figure 1:
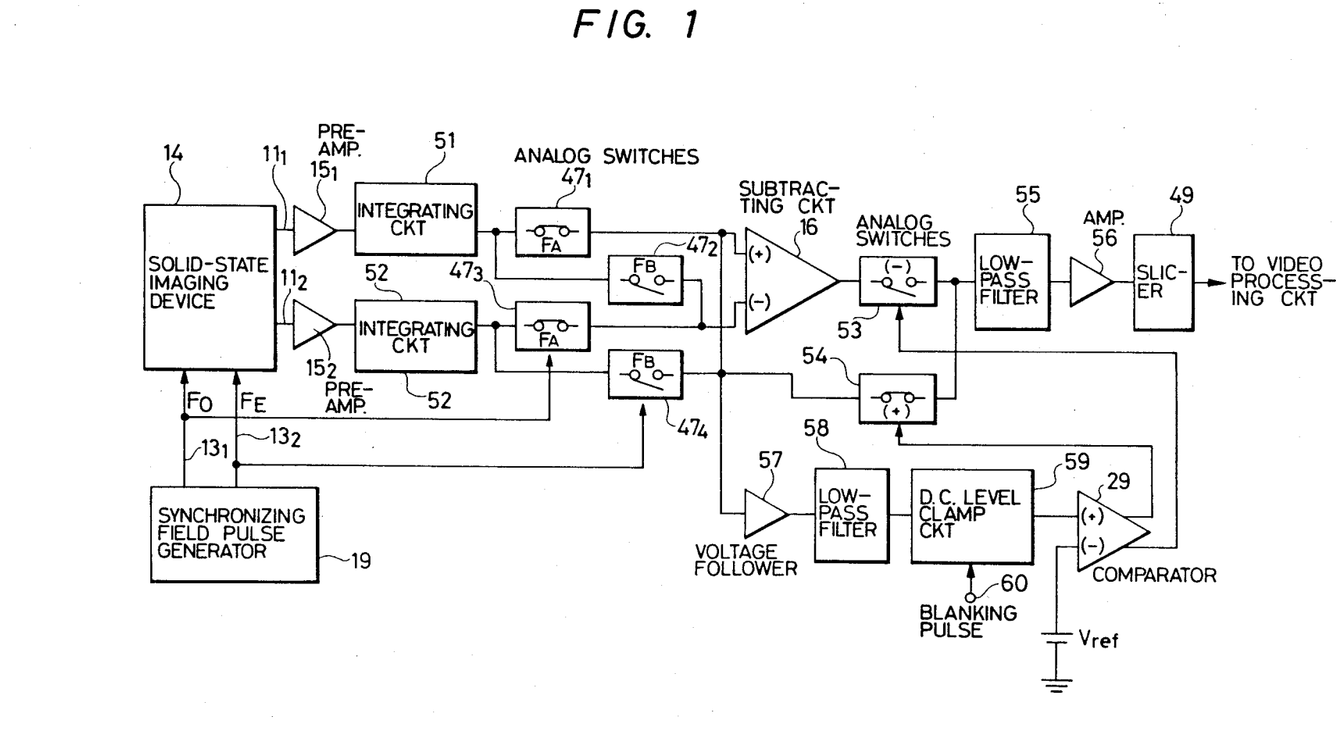
FIG. 1 is a view illustrating a solid-state imaging system with smear suppressing circuits according to the present invention.

In the case of this embodiment, output signal amplitudes of preamplifiers $15_1$, $15_2$ are respectively detected by the comparators $19_1$, $19_2$ and when a signal amplitude exceeds the reference level 20 ($I_0$ or $L_2$ of FIG. 5) and is saturated, the constitution does not include the circuit for subtraction described above. In this case, since the signal including the vertical smear is output from the subtracter 16 during the saturated period, only the signal component can be obtained by eliminating the signal higher than the saturation level $I_s$ with the slicer 21 because such signal is intrinsically not required. Effect of the Invention FIG. 1 shows another embodiment of a solid-state imaging system to which the present invention is applied and this embodiment has obtained total evaluation that it is the best embodiment among other embodiments at the time of filing the application of the present invention.

In the same figure, 51 and 52 are integral circuits for causing a solid-state imaging device 14 to cancel a fixed pattern noise which is peculiar noise element thereto. The signals obtained from the integral circuits 51 and 52 are selectingly supplied to the positive and negative input terminals of subtracter 16 for each odd and even-numbered field by the analog switches $47_1$ $47_4$ as in the case of FIG. 7. The subtracter 16 subtracts the smear component from a sum of the signal component and the smear component and the signal thus obtained is transmitted usually to a low-pass-filter 55 through the analog switch 53 and is amplified by the amplifier 56. Thereafter it is transmitted to an image signal processing circuit, in this case, without limitation by the slicer 49.

However, when illuminance of the object is high, an output of comparator 29 is inverted and imaging data corresponding to a sum of smear and signal components is by-passed directly to the low-pass-filter 55 through the analog switch 54 from the positive input terminal of subtracter 16. At this time, the subtracter 16 is excessively subtracting the smear component but its output is turned off by the analog switch 53. The signal passing the analog switch 54 is a sum of the signal component and the smear component and the smear component exceeding the saturation level $I_s$ of the photodiode 1 is eliminated by the slicer 49. It is idealistic that the slice level of slicer 49 corresponds to $I_s$ of FIG. 5 but usually an actual solid-state imaging device 14 and preamplifier 15 are always accompanied by manufacturing dispersion. Therefore when it is required to keep constant the maximum value of true image signal level or to perfectly eliminate the smear component considering such dispersion, it is enough to set the slice level to a value a little lower than the referfence $I_s$ or when it is required to not sacrifice any image signal at all, it is enough to set the slice level to a value a little higher than the reference $I_s$.

Reference numeral 57 is a voltage follower which prevents the influence of low-pass-filter 58 in the succeeding stage on the input terminal of the subtracter and the signal line of low-pass-filter 55, utilizing its high input impedance characteristic.

Reference numeral 59 is a DC clamp circuit which regenerates a DC level of an output signal of the low-pass-filter 58 and its DC level is associated the reference voltage source $V_{ref}$ which is supplied to the minus input terminal of the comparator 29 during the blanking period (using the blanking synchronous pulse 60) where there is no effect of the image signal. In the case of FIG. 1, such DC level is set to the earth potential in the same level as the minus side of $V_{ref}$.

According to this embodiment of the present invention, not only the smear component can be removed but also excessive subtraction of smear component can be prevented and such advantages can also be implemented with a simplified constitution.

Further, the present invention can be applied to all the solid-state imaging elements not only to the MOS type solid-state imaging element in which the path or route along which the signals originated in the picture elements belonging to the odd-numbered rows are extracted outwardly is separated not only in the MOS type solid-state imaging element but also in the interlacing operation from the path or route along which the signals orignating in the picture elements disposed on the even-numbered rows are taken out, wherein the signals transmitted along both routes are simultaneously output.

Figure 6:
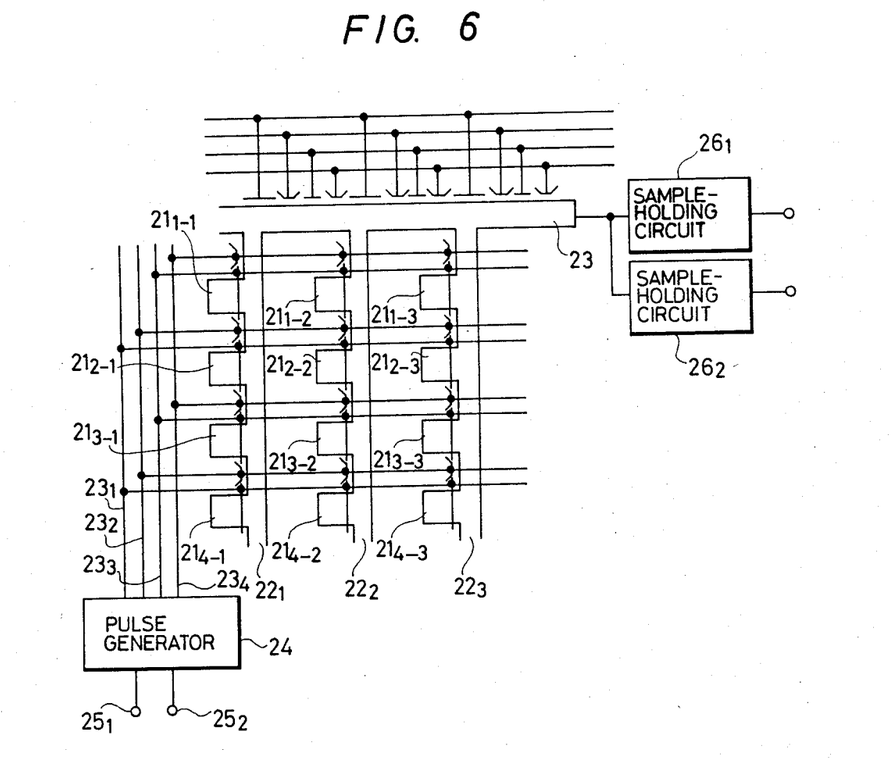
FIG. 6 is a view showing an example of the structure of an interline type CCD to which the present invention can be applied.

For example, in the case of an interline type CCD shown in FIG. 6, the photo-signals of photodiodes $21_{1-1}$, $21_{1-2}, \ldots, 21_{3-1}, 21_{3-2}$ and other belonging to the odd-numbered rows or lines are the photo-signals of photodiodes $21_{2-1}, 21_{2-2}, \ldots, 21_{4-1}, 21_{4-2}$ and others belonging to the even-numbered rows or lines can be separately transferred to the vertical CCDs $22_1$, $22_3$ and others and the horizontal CCD 23. To this end, the pulses applied to vertical transfer gates $23_1$ and $23_3$ by a pulse generator 24 are controlled through control input terminals $25_1$ and $25_2$ in such a manner that only the photo-signals of the photo-diodes belonging to the odd-numbered rows are transferred to the vertical CCDs for the odd-numbered field while only the signal of the photo-diodes arrayed on the even-numbered lines are transferred to the vertical CCDs for the even-numbered field. On these conditions, only the vertical smears are stored on those of the vertical CCDs to which no photo-signals of the photodiodes are transferred. Accordingly, in the even-numbered field, for example, sum signals of the photo signals produced by the photodiodes belonging to the odd-numbered rows and the vertical smear signals are obtained alternately with the vertical smear signals. These signals can be alternately separated from each other by sample-and-hold circuits $26_1$ and $26_2$ to thereby obtain the signals similar to those produced on the output signal lines $11_1$ and $11_2$ of the MOS type solid-state imaging device shown in FIG. 3. Thus, the smears can be eliminated by resorting to the means described in conjunction with the embodiments shown in FIGS. 4 and 5.

It will now be appreciated that the present invention has now provided a solid-state imaging device in which generation of the smears is prevented by providing the subtracting circuit and which can thus assure an improvement of image quality.

We claim:

1. An imaging system comprising:
   a photo-electric converter;
   a subtracter for subtracting a noise component from the sum of signal and noise components;
   a comparator for detecting whether said sum of signal and noise components exceeds a predetermined value; and
   a control circuit for preventing the overaction of the subtraction of said noise component from said sum signal and noise components in response to the output of said comparator.

2. An imaging system comprising:
   a photo-electric converter for converting picked up photo information into an electrical signal;
   a subtracter for subtracting between a sum signal of signal and noise components and noise signal; and
   a slicing circuit for limiting the upper level of the noise signal applied to said subtracter.

3. An imaging system comprising:
   a photo-electric converter for converting picked up photo information into an electrical signal, said converter including
   a first and a second output terminal at which a first signal including an imaging signal and a smear component and a second signal including a smear component alternatively appear;
   amplifiers responsive to said first and second signals;
   a subtracter, responsive to the outputs of sid amplifiers, for subtracting between signals corresponding to said first and second signals; and
   an output circuit for directing to an output terminal thereof one of a signal corresponding to a subtraction between said first and second signals and a signal having no relation with a subtraction of said first and second signals or having a relation with a subtraction between said first and second signals while an upper level of at least said second signal is limited.

4. The imaging system as defined in claim 3 in which, said photo-electric converter includes:
   a plurality of photodiodes arrayed in a plurality of rows and columns;
   a plurality of column signal lines;
   a plurality of row scanning lines for accessing in order the electrically converted imaging signals from said photodiodes in the even-numbered rows to the even-numbered column signal lines in an even field of one frame cycle, and from said photodiodes in the odd-numbered rows to the odd-numbered column signal lines in an odd field of one frame cycle; and
   a plurality of column scanning gates for coupling in order every set of the one of said even-numbered column signal lines and the one of said odd-numbered column signal lines with said first and second output terminals, respectively.

5. An imaging system comprising:
   a photo-electric converter;
   a subtracter for subtracting a noise component from the sum of signal and noise components;
   a comparator for detecting whether said sum of signal and noise components exceeds a predetermined value and providing a first output condition when said sum of signal and noise components is less than the predetermined value and for providing a second output condition when said sum of signal and noise components exceeds the predetermined value;
   an exchanging circuit responsive to said comparator for directing to an output terminal thereof the output of said subtracter when said comparator provides the first output condition and for directing to the output terminal thereof said sum of signal and noise components when said comparator provides the second output condition; and
   a slicing circuit, responsive to the output of said exchanging circuit, for limiting an upper level of said sum of signal and noise components.

6. An imaging system comprising:
   a photo-electric converter for converting picked up photo information into an electrical signal which includes a signal component responsive to said photo information and a noise component;

an output terminal:

a subtracter for subtracting between a signal responsive to the sum of said signal component and said noise component and a signal responsive to said noise component;

a comparator for producing an output signal having a first output status designating that a signal responsive to the sum of said signal component and said noise component is less than a predetermined value and a second output status designating that the signal responsive to the sum of said signal component and said noise component is greater than said predetermined value; and control circuit means responsive to said comparator for directing to said output terminal a signal corresponding to the subtraction output from said subtracter when said comparator designates said first output status and for directing to said output terminal a signal having a predetermined electrical value irrespective of the value of the sum of said signal component and said noise component when said comparator designates said second output status.

* * * * *